(12) United States Patent
Wilson et al.

(10) Patent No.: US 8,376,337 B2
(45) Date of Patent: Feb. 19, 2013

(54) ELLIPTICAL LOCATING APPARATUS

(75) Inventors: Bruce Allen Wilson, O'Fallon, MO (US); Dick Sellers, Byron, GA (US)

(73) Assignee: The Boeing Company, Chicago, IL (US)

(*) Notice: Subject to any disclaimer, the term of this patent is extended or adjusted under 35 U.S.C. 154(b) by 831 days.

(21) Appl. No.: 12/473,130

(22) Filed: May 27, 2009

(65) Prior Publication Data

US 2010/0301536 A1    Dec. 2, 2010

(51) Int. Cl.
*B23Q 7/00* (2006.01)
(52) U.S. Cl. .......... 269/53; 29/464; 324/750.25; 81/443
(58) Field of Classification Search .......... 269/53; 29/464, 525.01; 81/177.1–177.85
See application file for complete search history.

(56) References Cited

U.S. PATENT DOCUMENTS

| | | | |
|---|---|---|---|
| 1,362,585 A | 12/1920 | Smith | |
| 3,703,762 A | 11/1972 | Lind | |
| 3,719,119 A | 3/1973 | Straub | |
| 3,810,502 A * | 5/1974 | Kyser | 81/443 |
| 4,538,355 A * | 9/1985 | Morghen | 33/613 |
| 4,585,217 A | 4/1986 | Erickson | |
| 4,834,358 A | 5/1989 | Okolischan et al. | |
| 4,968,012 A | 11/1990 | Haddad et al. | |
| 5,168,638 A * | 12/1992 | Barton | 33/644 |
| 5,479,698 A | 1/1996 | Angel | |
| 5,713,118 A | 2/1998 | Swann et al. | |
| 6,163,160 A * | 12/2000 | Hanrahan et al. | 324/750.25 |
| 6,775,919 B2 | 8/2004 | Liebig et al. | |
| 2004/0051253 A1 | 3/2004 | Clemons et al. | |

FOREIGN PATENT DOCUMENTS

| | | |
|---|---|---|
| DE | 19913171 A1 | 9/2000 |
| EP | 1316465 A1 | 6/2003 |
| EP | 1223001 B1 | 10/2004 |

OTHER PUBLICATIONS

PCT Search for application PCT/US2010/031288 dated Jul. 21, 2010.
PCT Search for application PCT/US2010/031291 dated Jul. 26, 2010.

* cited by examiner

*Primary Examiner* — Monica Carter
*Assistant Examiner* — Melanie Alexander
(74) *Attorney, Agent, or Firm* — Yee & Associates, P.C.

(57) ABSTRACT

A method and apparatus for aligning objects may be present. A locating pin may be positioned relative to secondary holes in a plurality of objects. The locating pin may comprise a segment with a cross section having an elliptical shape, a surface, and an indicating feature associated with the segment. The locating pin may be inserted into the secondary hole, wherein a number of portions of the surface align the secondary holes.

28 Claims, 11 Drawing Sheets

ELLIPTICAL LOCATING APPARATUS

GOVERNMENT LICENSE RIGHTS

This invention was made with Government support under contract number FA8202-07-D-0004 awarded by the Air Force. The Government has certain rights in this invention.

CROSS REFERENCE TO RELATED APPLICATION

The present disclosure is related to the following patent application entitled "Angled Locating Apparatus", Ser. No. 12/473,152, filed even date hereof, assigned to the same assignee, and incorporated herein by reference.

BACKGROUND INFORMATION

1. Field

The present disclosure relates generally to manufacturing and, in particular, to assembling parts to form structures. Still more particularly, the present disclosure relates to a method and apparatus for aligning parts using holes.

2. Background

In manufacturing aircraft, parts may be assembled to form the different structures for the aircraft. The assembly of parts may include, for example, without limitation, attaching skin panels to spars, ribs, stringers, and/or other structural components.

In attaching parts to each other, holes may be present in the parts for installing fasteners to attach the parts to each other. Further, holes also may be present to provide alignment of parts to each other in an assembly.

For example, without limitation, when multiple part holes are present in each part in assembly, these holes may be used to align the parts to each other. This type of alignment also may be referred to as self locating. This alignment may align a first part with a second part. In each part, one hole in the first part may be aligned with one hole in the second part.

These holes may be referred to as the primary holes. The other hole in the first part may be aligned with the other hole in the second part. These holes may be used to provide a desired orientation of the first part with respect to the second part. These holes may be referred to as secondary holes. The secondary holes may provide alignment to an identified location in the direction that stops rotation about the primary holes.

In manufacturing holes in parts, variances may be present with respect to various parameters for holes. These variances may include, for example, without limitation, hole size, hole orientation, hole location, and/or other types of parameters with respect to holes. When using holes to establish relative locations of parts to each other, variations in hole locations on each of the objects may prevent the holes from perfectly aligning with each other.

For example, when assembling parts, alignment of the parts using the holes may be performed by passing a pin through a primary hole in all of the parts. The insertion of this pin through the primary holes may establish a common axis or origin for the parts. Another pin may be inserted through the secondary holes. This second pin may prevent rotation around the common axis of the primary holes. The second pin may provide alignment of the different parts to each other about the common axis. The second pin also may be referred to as a locating pin.

Variation in the locations of the centers of the holes may result in the secondary holes not being perfectly aligned when positioning parts with respect to each other. With this situation, the locating pin in the secondary holes may need to have a smaller diameter than the diameters of the holes to be able to insert the locating pin into the secondary holes. This smaller sized locating pin may not locate the secondary holes in the desired direction with sufficient accuracy to stop rotation about the axis of the primary holes.

As a result, the different parts may potentially rotate relative to each other. This rotation may be an amount that is as much as the clearance between the hole sizes and the size of the locating pin. This potential movement may result in a difference in the desired location between the parts in the assembly and the actual location of the parts.

Therefore, it would be advantageous to have a method and apparatus that takes into account one or more of the issues discussed above, as well as possibly other issues.

SUMMARY

In one advantageous embodiment, a method may be present for aligning a plurality of objects. A locating pin may be positioned relative to secondary holes in a plurality of objects. The locating pin may comprise a segment with a cross section having an elliptical shape, a surface, and an indicating feature associated with the segment. The locating pin may be inserted into the secondary hole, wherein a number of portions of the surface align the secondary holes to align the plurality of objects.

In another advantageous embodiment, a method may be present for aligning objects. A locating pin may be positioned relative to secondary holes in a plurality of objects. The locating pin may comprise a segment and an indicating feature associated with the segment. The segment may have a cross section with an elliptical shape and a surface. The segment may be tapered from a first end of the segment to a second end of the segment. The second end may have a shape selected from one of a bullet shape and a conical shape. The indicating feature may be configured to indicate a direction in which the surface aligns the secondary holes. A diameter of the locating pin may have a major diameter and a minor diameter. A number of portions of the surface may be formed by the major diameter. The major diameter of the cross section at around the first end may be configured to be inserted into a largest secondary hole in the secondary holes, and the minor diameter of the cross section at around the second end may be configured to be inserted into a portion of a channel having a smallest diameter in the channel formed by the secondary holes. The locating pin may be inserted into the secondary holes, wherein the number of portions of the surface aligns the secondary holes. A first pin may be placed into primary holes in the plurality of objects. The locating pin may prevent rotation of any of the plurality of objects about a centerline axis through the primary holes. A number of operations may be performed on the plurality of objects with the first pin inserted into the primary holes and the locating pin inserted in the secondary holes.

In yet another advantageous embodiment, an apparatus may comprise a segment, a cross section in the segment, and a surface. The cross section may have an elliptical shape. The surface may have a number of portions of the surface configured to align secondary holes in a plurality of objects when the segment is in the secondary holes.

In still yet another advantageous embodiment, an apparatus for aligning objects may comprise a segment, a cross section in the segment having an elliptical shape, a surface of the segment, an indicating feature associated with the segment, and a pin. The segment may be tapered from a first end of the segment to a second end of the segment, and the second end may have a shape selected from one of a bullet shape and a conical shape. The cross section in the segment may have a major diameter and a minor diameter. The major diameter of the cross section at around the first end may be configured to be inserted into a largest secondary hole in secondary holes in a plurality of objects, and the minor diameter of the cross section at around the second end may be configured to be inserted into a portion of a channel having a smallest diameter in the channel formed by the secondary holes. A number of portions of the surface may be configured to align the secondary holes to align the plurality of objects when the segment in a plurality of objects is in the secondary holes. The number of portions of the surface may be relative to the major diameter. The number of portions of the surface may be configured to apply a force on walls of the secondary holes to align the secondary holes in a desired direction. The segment may be configured to prevent rotation of any of the plurality of objects about a centerline axis through primary holes in the plurality of objects. The indicating feature may be configured to indicate a direction in which the number of portions of the surface aligns the secondary holes. The pin may be configured to be inserted into the primary holes in the plurality of objects.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
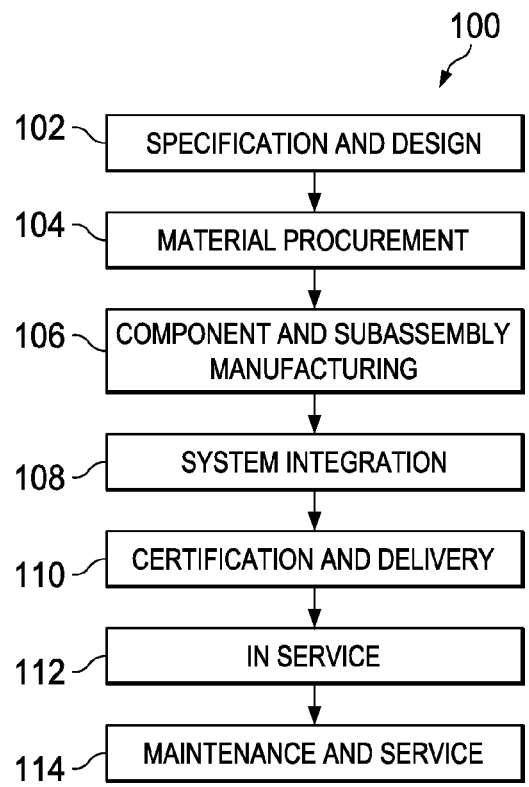
FIG. 1 is an illustration of an aircraft manufacturing and service method in accordance with an advantageous embodiment.
Figure 2:
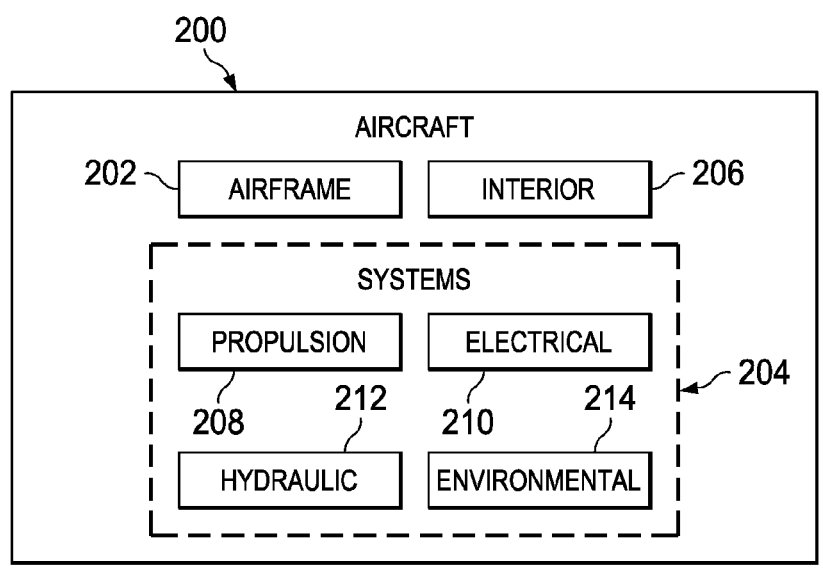
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

For example, without limitation, one or more of the different advantageous embodiments may be used during at least one of component and subassembly manufacturing 106 and maintenance and service 114 to align objects to each other. These objects may be a number of parts and/or a number of tools.

As used herein, a number of items refers to one or more items. For example, a number of parts is one or more parts. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

The different advantageous embodiments recognize and take into account a number of different considerations. For example, the different advantageous embodiments recognize and take into account that alignment of primary holes for objects may result in difficulty in aligning secondary holes that may be used to align the parts to each other relative to an axis that may be formed through alignment of the primary holes.

The different advantageous embodiments also recognize that alignment of the secondary holes to each other may be more difficult because of tolerances in the holes. These tolerances may include, for example, without limitation, tolerances in size, shape, orientation, and location of the holes on the objects.

The different advantageous embodiments recognize that some solutions may be present for solving these problems. For example, without limitation, when an object is a tool, a slotted bushing may sometimes be used. When the object is a part, a slotted hole also may be used in some cases.

The different advantageous embodiments, however, recognize and take into account that slotted holes may not always be used because of the edge distance and other structural requirements. Thus, when slotted features cannot be used, the different advantageous embodiments recognize that other mechanisms may be needed to obtain the desired alignment between the parts.

The different advantageous embodiments recognize that a cylindrical pin having a diameter equal in size to the diameter of the secondary holes may not be inserted in the secondary holes because of variations in the holes. For example, some of the secondary holes may have smaller diameters and/or different locations for the centers of the holes. As a result, the secondary holes may have an apparent elliptical shape in which a minor diameter is present that may be smaller than the hole diameter. As a result, a smaller diameter locating pin may be needed to enter the secondary holes. This smaller diameter locating pin may, however, allow for undesired movement with respect to the alignment of parts with respect to each other.

The different advantageous embodiments also recognize that a round tapered pin may be used in these secondary holes. A round tapered pin is a pin that has a diameter that may decrease along the length of the pin. This round tapered pin, however, when inserted in the secondary holes, may not adequately prevent part rotation around an axis in the primary holes. The round tapered pin may not provide the needed contact to all of the secondary holes in the objects.

The different advantageous embodiments also recognize and take into account that increasing the diameter of one or more holes in the objects may permit a locating pin to enter the secondary holes. These larger hole diameters, however, may result in a loss of accuracy in aligning or positioning parts with respect to each other.

Thus, the different advantageous embodiments provide a method and apparatus for aligning holes. In one advantageous embodiment, an apparatus may have a segment, a cross-section in the segment having an elliptical shape, and a surface of the segment having a portion of the surface configured to align the secondary holes when the segment is inserted into the secondary holes.

In another advantageous embodiment, an apparatus may comprise a segment and a cross-section in the segment having a number of portions alternating between curved sections and angled sections. The apparatus also may have a surface. Portions of the surface corresponding to the curved sections are configured to align the secondary holes in a plurality of objects when the segment is inserted into the secondary holes.

Figure 3:
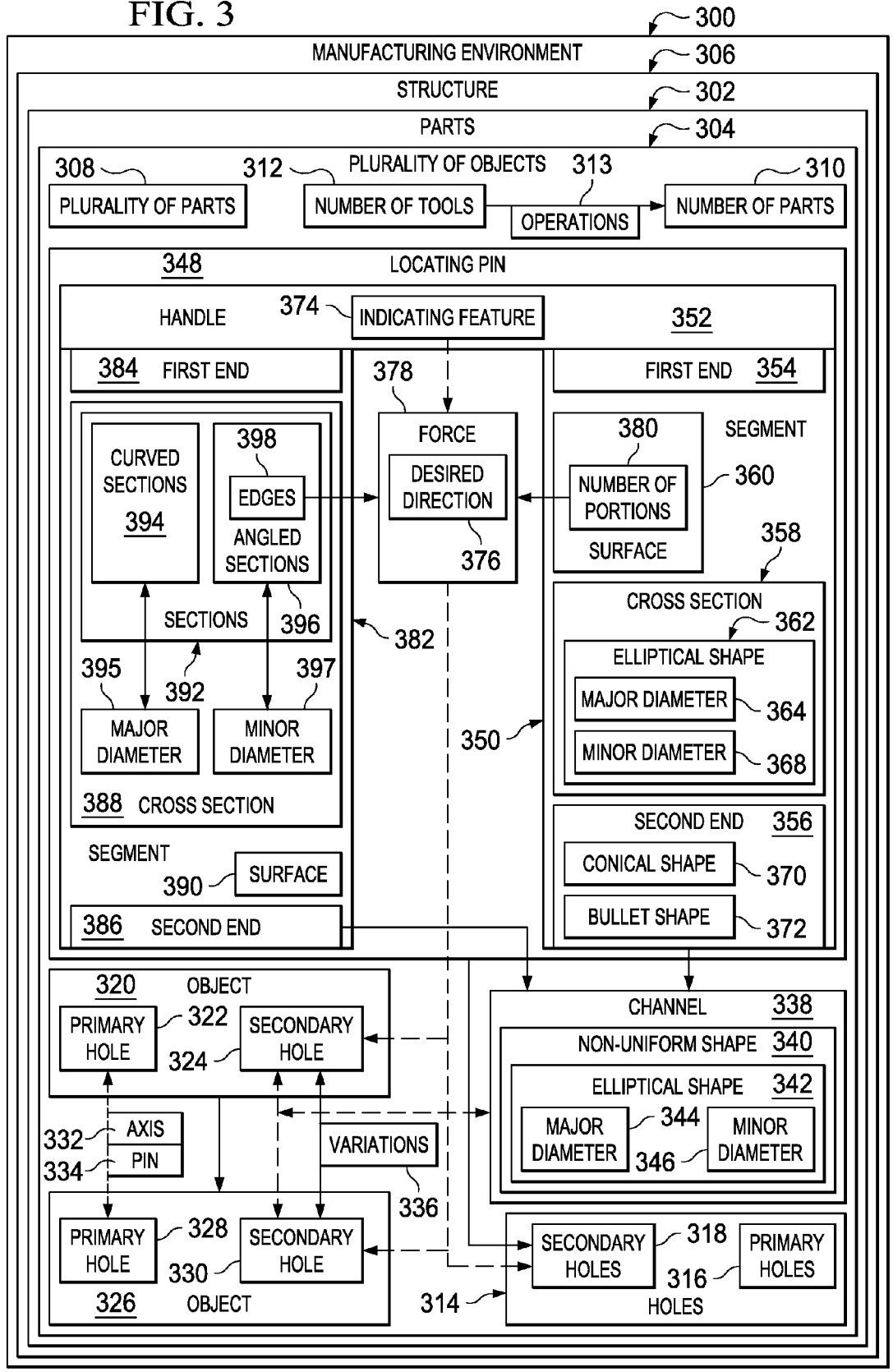
FIG. 3 is an illustration of a manufacturing environment in accordance with an advantageous embodiment.

With reference now to FIG. 3, an illustration of a manufacturing environment is depicted in accordance with an advantageous embodiment. Manufacturing environment 300 is an example of an environment that may be used to assemble parts 302 for structure 306. Structure 306 may be a structure in a platform such as, for example, without limitation, aircraft 200 in FIG. 2.

In this illustrative example, plurality of objects 304 may be used to assemble structure 306. Plurality of objects 304 may be, for example, without limitation, plurality of parts 308 for structure 306. In other advantageous embodiments, plurality of objects 304 may be number of parts 310 and number of tools 312. As depicted, number of tools 312 may be used to perform operations 313 on number of parts 310 for structure 306.

In these illustrative examples, plurality of objects 304 may have holes 314. Holes 314 may include, without limitation, primary holes 316 and secondary holes 318.

For example, without limitation, object 320 in plurality of objects 304 may have primary hole 322 and secondary hole 324. Object 326 in plurality of objects 304 may have primary hole 328 and secondary hole 330. Alignment of object 320 to object 326 may be performed by placing object 320 onto object 326. Primary hole 322 may be aligned with primary hole 328. Alignment of these holes may form axis 332. Object 320 may be rotated relative to object 326 about axis 332 to align secondary hole 324 with secondary hole 330. When these holes are aligned, object 320 may be considered to be aligned with object 326.

In these illustrative examples, pin 334 may be placed through primary hole 322 and primary hole 328. With pin 334 placed through primary hole 322 and primary hole 328, object 320 and object 326 may be moved relative to each other about axis 332. Alignment of secondary hole 324 and secondary hole 330 may be made more difficult if variations 336 are present in either secondary hole 324 or secondary hole 330.

In other words, when secondary hole 324 is aligned with secondary hole 330, channel 338, formed by secondary hole 324 and secondary hole 330, may have non-uniform shape 340. For example, without limitation, non-uniform shape 340 may be elliptical shape 342 having major diameter 344 and minor diameter 346. Non-uniform shape 340 may increase the difficulty in aligning secondary hole 324 with secondary hole 330 using a pin similar to pin 334.

The different advantageous embodiments may provide a capability to prevent undesired rotation or movement about axis 332 between object 320 and object 326 when secondary hole 324 is aligned with secondary hole 330. In these illustrative examples, locating pin 348 may be placed into channel 338 in a manner that may prevent rotation or movement of object 320 and/or object 326 relative to each other about axis 332.

In these illustrative examples, locating pin 348 may have segment 350 and handle 352. Segment 350 may have first end 354 and second end 356. First end 354 may be associated with handle 352. A first component may be considered associated with a second component by being secured to the second component, bonded to the second component, fastened to the second component, and/or connected to the second component in some other suitable manner. A first component also may be considered to be associated with a second component by being formed as part of and/or an extension of the second component.

Second end 356 may be placed into secondary holes 318. For example, without limitation, second end 356 may be placed into channel 338 formed by secondary hole 324 and secondary hole 330.

Segment 350 may have cross section 358 and surface 360. Cross section 358 may have elliptical shape 362. Elliptical shape 362 may have major diameter 364 and minor diameter 368. Segment 350 may be constant and/or may be tapered. In other words, cross section 358 may decrease in size from first end 354 to second end 356. Second end 356 may have conical shape 370, bullet shape 372, and/or some other suitable shape.

Further, handle 352 may have indicating feature 374. Indicating feature 374 may indicate desired direction 376. Desired direction 376 may be a desired direction for force 378 that may be applied by number of portions 380 of surface 360. Number of portions 380 may be non-contiguous in these illustrative examples.

In these illustrative examples, indicating feature 374 may take various forms. For example, indicating feature 374 may be, without limitation, a handle, holes, a flat surface, and/or some other suitable indicating feature.

In the different illustrative examples, number of portions 380 of surface 360 may correspond to major diameter 364. As a result, number of portions 380 of surface 360 may contact portions of channel 338 corresponding to major diameter 364.

In another advantageous embodiment, locating pin 348 may have segment 382. In this illustrative example, segment 382 may have first end 384 and second end 386. First end 384 may be associated with handle 352. In this illustrative example, segment 382 may have cross section 388 and surface 390. Cross section 388 may have sections 392. Sections 392 may alternate between curved sections 394 and angled sections 396. Further, cross section 388 may have major diameter 395 and minor diameter 397. In these examples, minor diameter 397 may correspond to angled sections 396, while major diameter 395 may correspond to curved sections 394. Further, minor diameter 397 may be configured to allow insertion of locating pin 348 into a portion of channel 338 having smallest diameter distance across channel 338.

Second end 386 may be placed into channel 338. Second end 386 also may have conical shape 370, bullet shape 372, and/or some other suitable shape.

In these illustrative examples, angled sections 396 may be configured to align secondary holes 318 when segment 382 is placed into secondary holes 318 in plurality of objects 304. In these illustrative examples, angled sections 396 have edges 398, which may contact secondary holes 318. Edges 398 may provide force 378 in desired direction 376 on secondary holes 318. Further, cross section 388 also may taper within segment 382. In this manner, locating pin 348 may enter secondary holes 318 with either segment 382 or segment 350.

Insertion of locating pin 348 with segment 350 into secondary holes 318 may allow rotation or movement of locating pin 348 to align secondary holes 318. In these examples, plurality of objects 304 may be moved relative to each other about axis 332. This movement may be performed to align secondary holes 318 using locating pin 348. The alignment of secondary holes 318 may align plurality of objects 304 with each other.

Number of portions 380 of surface 360 corresponding to major diameter 364 may be used to align secondary holes 318 in desired direction 376. Minor diameter 368 may provide sufficient clearance to take into account variations 336.

Curved sections 394 corresponding to major diameter 395 for segment 382 may be used to align secondary holes 318 in desired direction 376. Angled sections 396 with edges 398 corresponding to minor diameter 397 may provide sufficient clearance to accommodate for variations 336 in secondary holes 318.

The illustration of manufacturing environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, pin 334 may be implemented using locating pin 348. In yet other advantageous embodiments, more than two objects may be present in addition to those illustrated in the depicted examples. In yet other advantageous embodiments, each object may have more than one secondary hole, depending on the particular implementation.

In the different advantageous embodiments, a number of materials may be used for locating pin 348. For example, without limitation, when locating hard materials unlikely to be damaged by hard metal pins, locating pin 348 may be made of carbon steel, stainless steel, and/or some other suitable form of steel or metal. In other examples, when locating softer materials, brass and/or aluminum may be used in locating pin 348. In still other examples, locating pin 348 may be made of plastic and/or some other suitable material when locating lightweight objects made of fragile materials.

Figure 4:
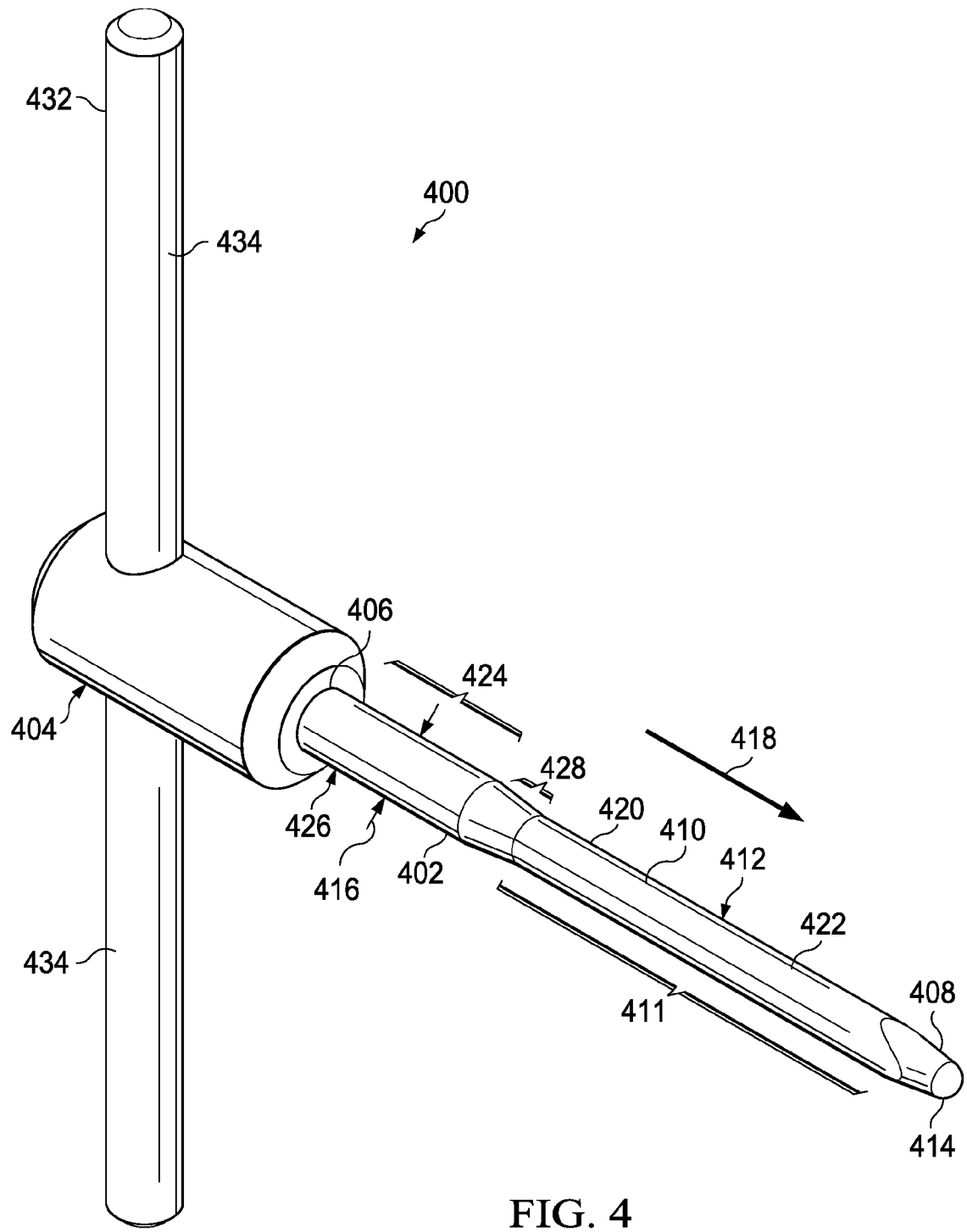
FIG. 4 is an illustration of a locating pin in accordance with an advantageous embodiment.

With reference now to FIG. 4, an illustration of a locating pin is depicted in accordance with an advantageous embodiment. In this illustrative example, locating pin 400 may be an example of one implementation of locating pin 348 in FIG. 3. Locating pin 400 may have segment 402 and handle 404. Segment 402 may have first end 406 and second end 408. First end 406 may be associated with handle 404.

In this example, segment 402 may have surface 410. As can be seen in this example, segment 402 may be associated with handle 404. Section 411 of segment 402 may have elliptical shape 412. Second end 408 may have bullet shape 414 in this illustrative example. Of course, other shapes may be used, depending on the particular implementation. As depicted, segment 402 may be tapered from first end 406 to second end 408. Segment 402 may have diameter 416, which may become smaller as segment 402 tapers. In this illustrative example, segment 402 may become smaller in the direction of arrow 418.

Diameter 416 at location 420 may be selected to provide a capability to engage a largest hole in the secondary holes, while diameter 416 at location 422 may be selected to allow entry and locating of a portion of a channel having a smallest diameter in the channel formed by the secondary holes. The channel may be smaller in distance than the secondary holes. This difference in diameter of the channel and the secondary holes may be caused by misalignment of the secondary holes.

In this illustrative example, segment 402 may not have elliptical shape 412 throughout segment 402. For example, section 424 may have cylindrical shape 426, while section 428 provides a transition between cylindrical shape 426 in section 424 and elliptical shape 412 in section 411. In this illustrative example, handle 404 has indicating feature 432. Indicating feature 432 may be rod 434. Of course, other types of indicating features may be used, such as holes, flat sections, color, or other suitable indicators.

Figure 5:
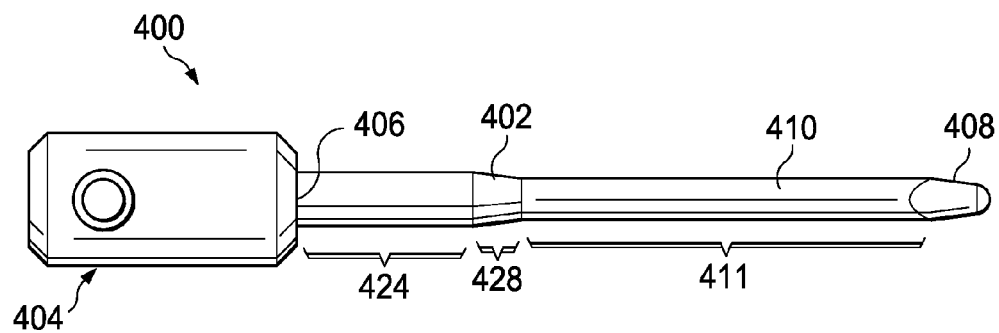
FIG. 5 is an illustration of a top view of a locating pin in accordance with an advantageous embodiment.
Figure 6:
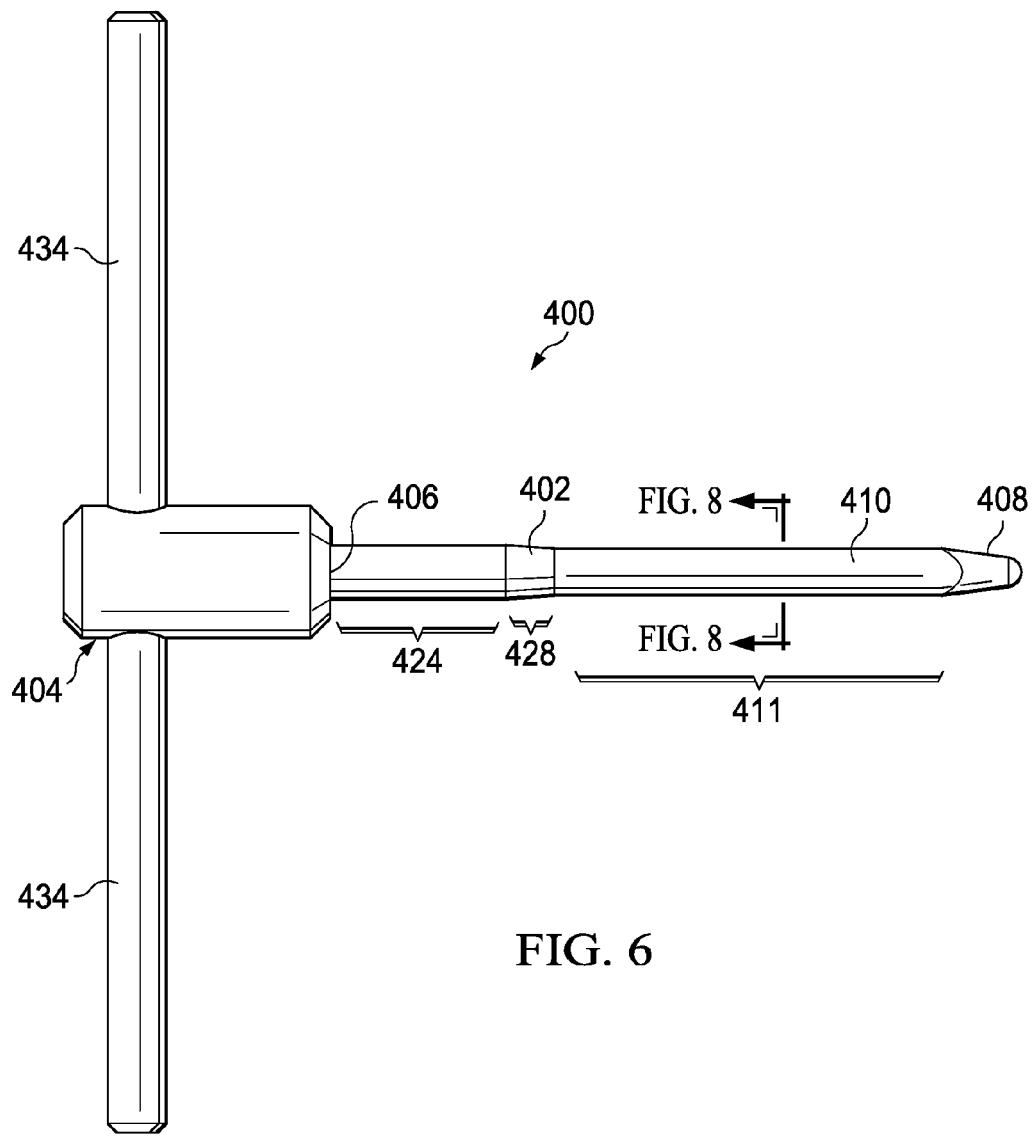
FIG. 6 is an illustration of a side view of a locating pin in accordance with an advantageous embodiment.

Turning now to FIG. 5, an illustration of a top view of locating pin 400 is depicted in accordance with an advantageous embodiment. With reference next to FIG. 6, an illustration of a side view of locating pin 400 is depicted in accordance with an advantageous embodiment.

Figure 7:
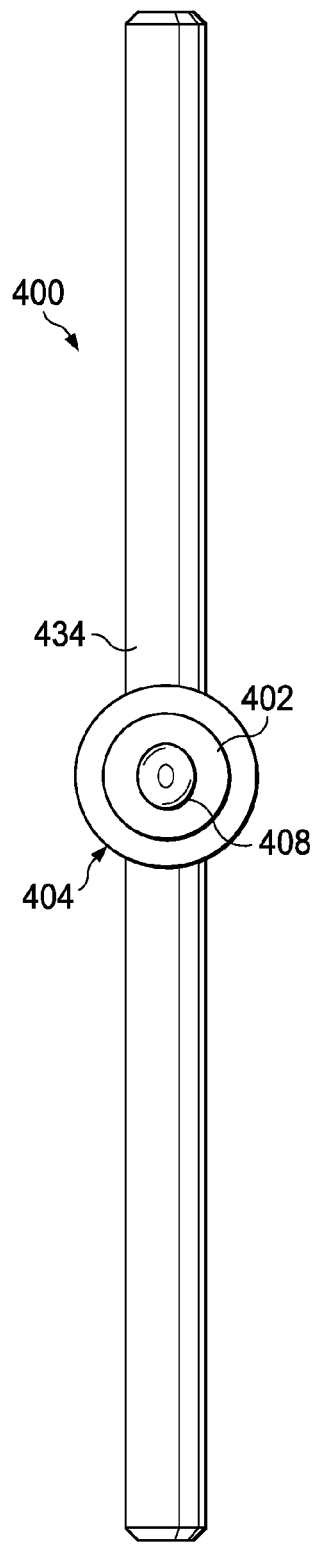
FIG. 7 is an illustration of a view of one end of a locating pin in accordance with an advantageous embodiment.

Turning now to FIG. 7, an illustration of a view of one end of a locating pin is depicted in accordance with an advantageous embodiment. In this example, locating pin 400 may be seen from second end 408.

Figure 8:
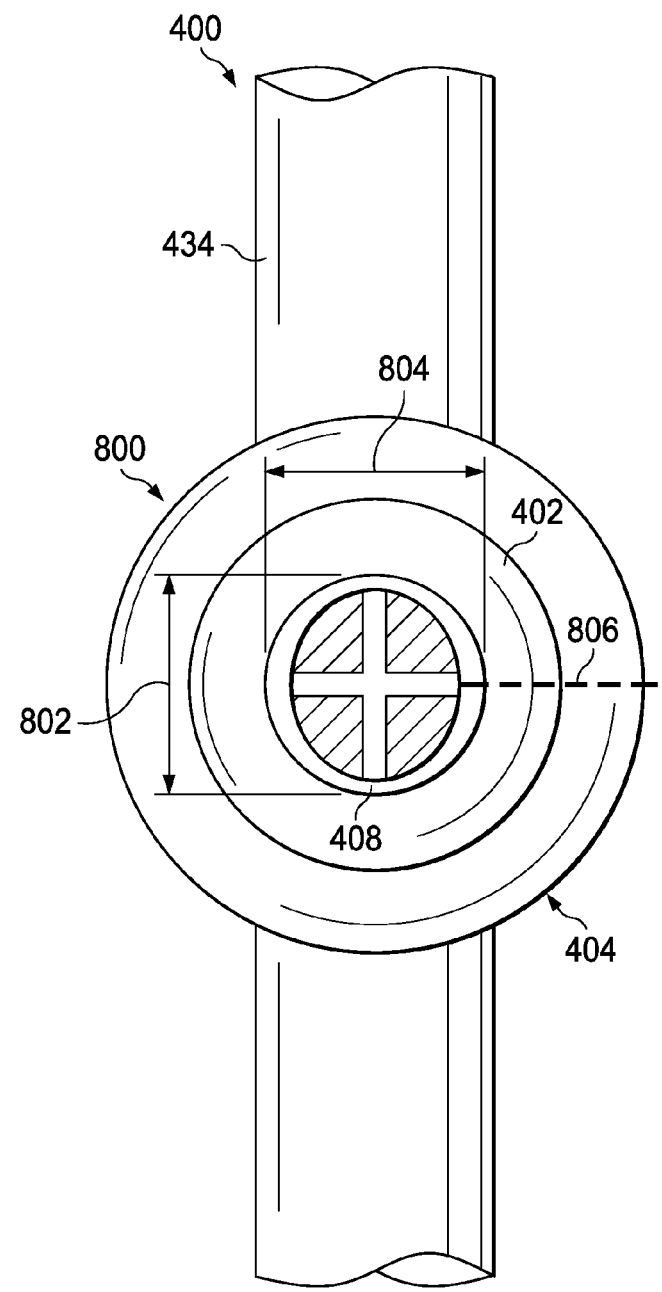
FIG. 8 is an illustration of a cross-sectional view of a locating pin in accordance with an advantageous embodiment.

With reference now to FIG. 8, an illustration of a cross-sectional view of a locating pin is depicted in accordance with an advantageous embodiment. In this example, locating pin 400 is a cross-sectional view taken along lines 8-8.

As can be seen in this example, cross section 800 may have major diameter 802 and minor diameter 804. Major diameter 802 may be aligned with rod 434 on handle 404. As illustrated, rod 434 and major diameter 802 may be substantially perpendicular to line 806, which, when inserted in the secondary holes, may be a line extending between primary holes 316 and secondary holes 318 in FIG. 3.

Figure 9:
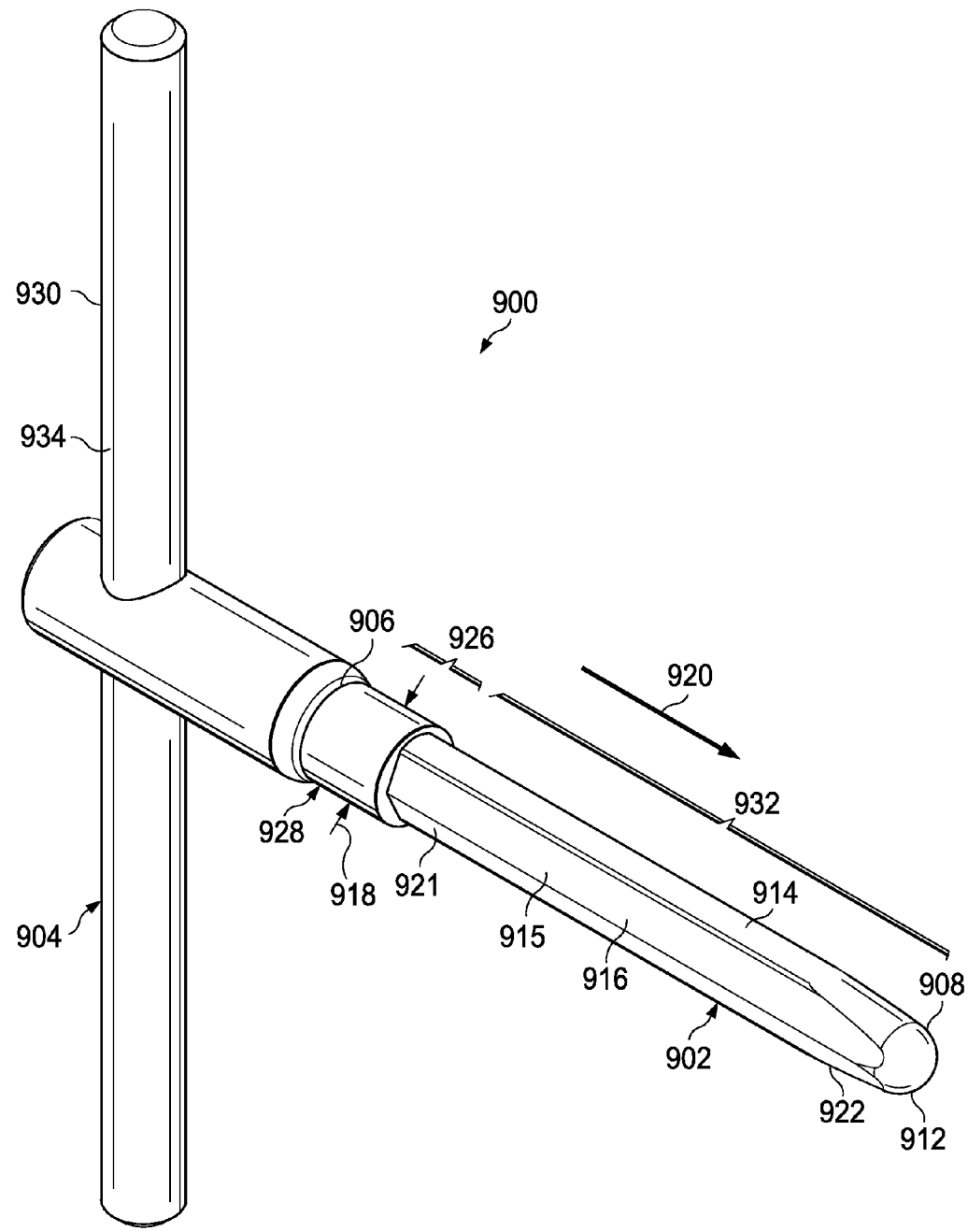
FIG. 9 is an illustration of a locating pin in accordance with an advantageous embodiment.

Turning now to FIG. 9, an illustration of a locating pin is depicted in accordance with an advantageous embodiment. In this example, locating pin 900 is an example of one implementation of locating pin 348 in FIG. 3. In this example, locating pin 900 may have segment 902 and handle 904. Segment 902 may be associated with handle 904. Segment 902 may have first end 906 and second end 908. First end 906 may be associated with handle 904.

Second end 908 may have bullet shape 912 in this example. Segment 902 may have surface 915. As can be seen in this view, segment 902 has curved section 914 and angled section 916. An additional curved section and angled section may be present, but not seen in this view.

Also, segment 902 may have diameter 918, which may decrease in size in the direction of arrow 920. Diameter 918 may be selected to provide a capability to locate and/or maintain alignment of a largest hole in a secondary hole at around location 921. Diameter 918 may be selected to have a size that provides a capability to allow entry of segment 902 and maintain alignment of a portion of a channel having a smallest diameter in the channel formed by the secondary holes at around location 922.

In this example, portion 932 may contain curved section 914 and angled section 916. Portion 926 of segment 902 may have cylindrical shape 928. Further, handle 904 may have indicating feature 930. In this example, indicating feature 930 may take the form of rod 934.

Figure 10:
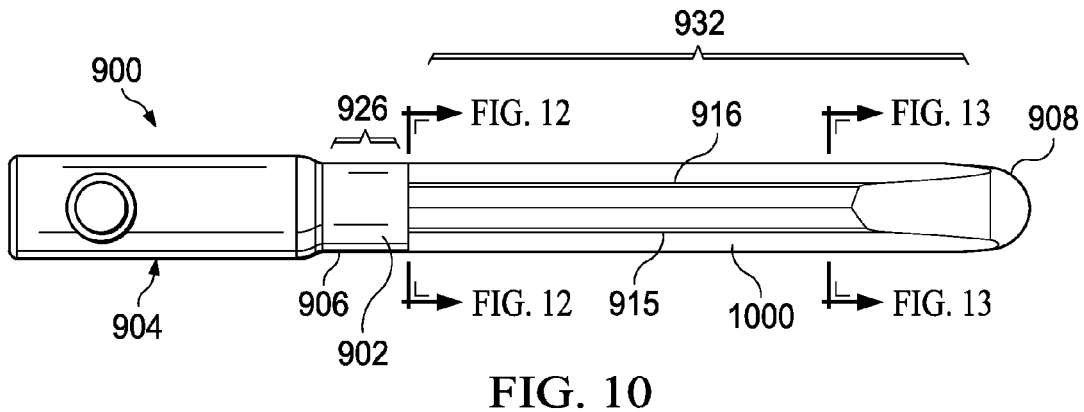
FIG. 10 is an illustration of a top view of a locating pin in accordance with an advantageous embodiment.
Figure 11:
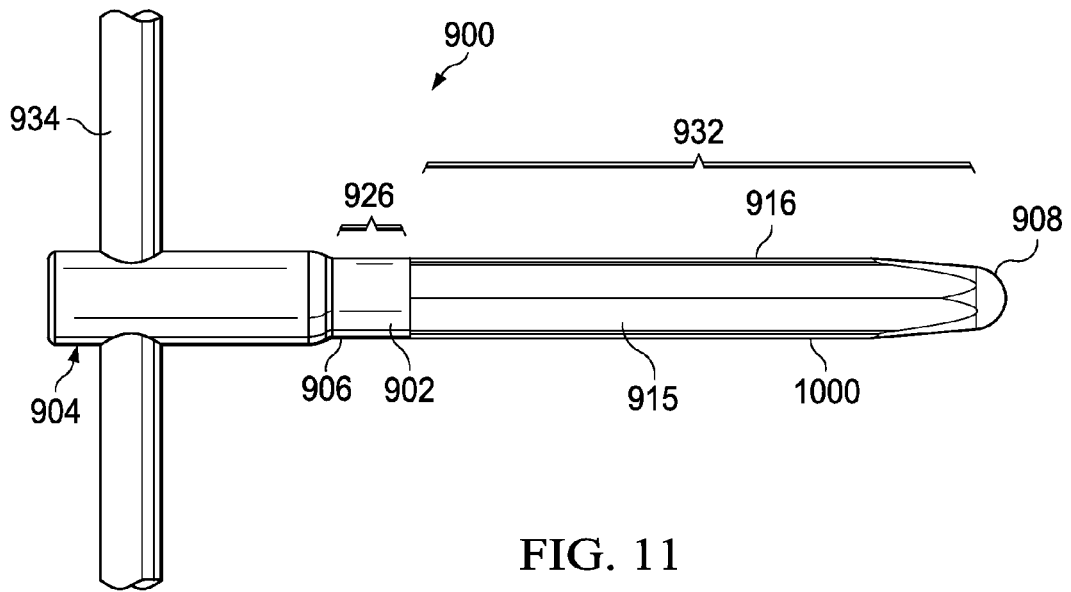
FIG. 11 is an illustration of a side view of a locating pin in accordance with an advantageous embodiment.

With reference now to FIG. 10, an illustration of a top view of locating pin 900 is depicted in accordance with an advantageous embodiment. In this view, angled section 1000 also may be seen in addition to angled section 916. Turning now to FIG. 11, an illustration of a side view of locating pin 900 is depicted in accordance with an advantageous embodiment.

Figure 12:
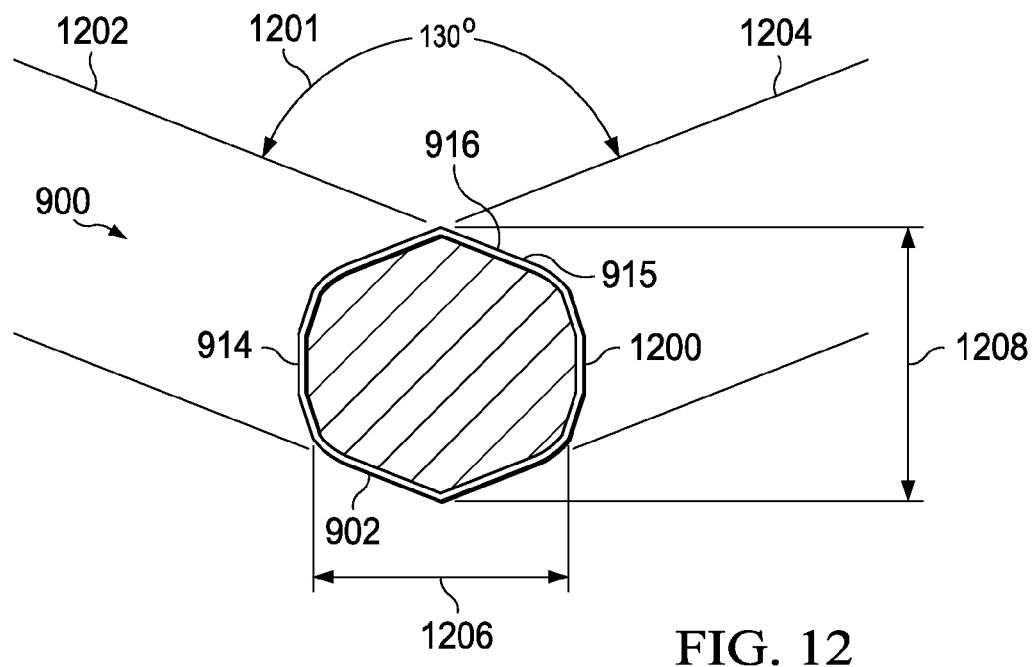
FIG. 12 is an illustration of a cross-sectional view of a locating pin in accordance with an advantageous embodiment.

With reference next to FIG. 12, an illustration of a cross-sectional view of a locating pin is depicted in accordance with an advantageous embodiment. In this example, locating pin 900 is seen in a cross-sectional view taken along lines 12-12 in FIG. 10.

In this cross-sectional view, curved section 1200 may be seen in addition to curved section 914. Surface 915 may alternate between a curved section and an angled section. As illustrated in this view, angled section 916 may have angle 1201 of around 130 degrees measured between lines 1202 and 1204. In other advantageous embodiments, angle 1201 may be some other angle. Further, in this view, major diameter 1206 and minor diameter 1208 may be seen.

Figure 13:
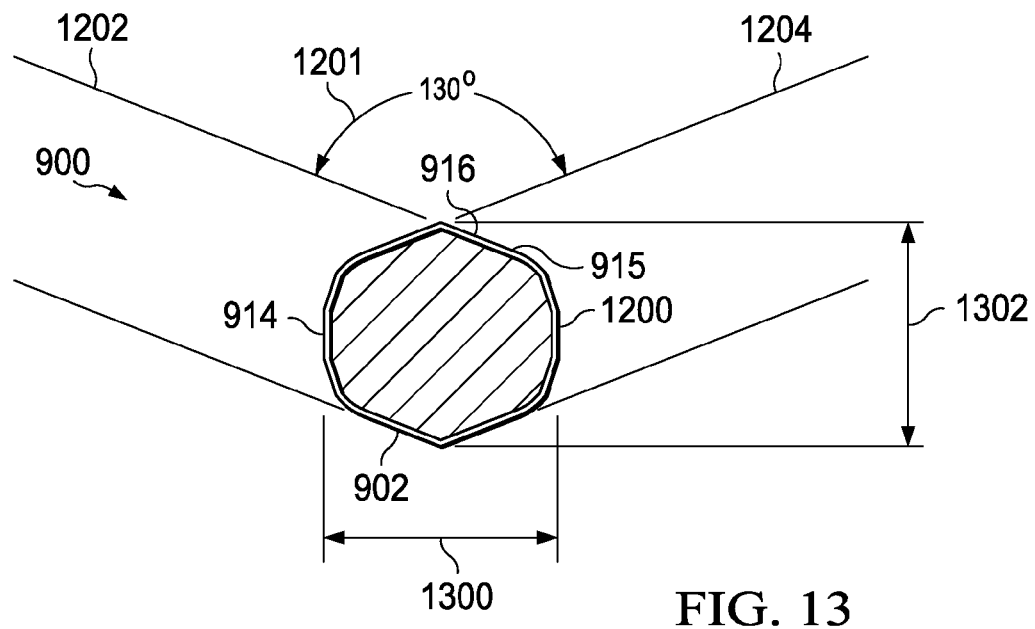
FIG. 13 is an illustration of a cross-sectional view of another portion of a locating pin in accordance with an advantageous embodiment.

Turning now to FIG. 13, an illustration of a cross-sectional view of another portion of a locating pin is depicted in accordance with an advantageous embodiment. In this depicted example, locating pin 900 may be seen in a cross-sectional view taken along lines 13-13 in FIG. 10.

In this illustrative example, locating pin 900 may have major diameter 1300 and minor diameter 1302. Major diameter 1300 may be smaller than major diameter 1206. Minor diameter 1302 also may be smaller than minor diameter 1208.

Rod 434 (not shown) may be in alignment with major diameter 1206 and major diameter 1300. Major diameter 1300 may be aligned with curved section 914 and curved section 1200. Minor diameter 1302 may be aligned with angled section 916 and angled section 902.

Figure 14:
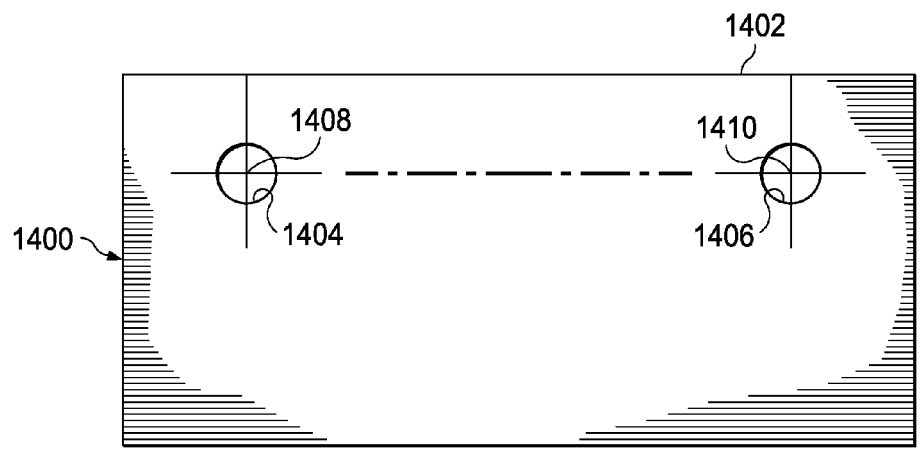
FIG. 14 is an illustration of an object in accordance with an advantageous embodiment.

Turning now to FIG. 14, an illustration of an object is depicted in accordance with an advantageous embodiment. In this illustrative example, object 1400 is an example of one implementation for an object in plurality of objects 304 in FIG. 3.

Object 1400 may take the form of part 1402 in this illustrative example. Part 1402 may have primary hole 1404 and secondary hole 1406. Primary hole 1404 may have center 1408, and secondary hole 1406 may have center 1410.

Figure 15:
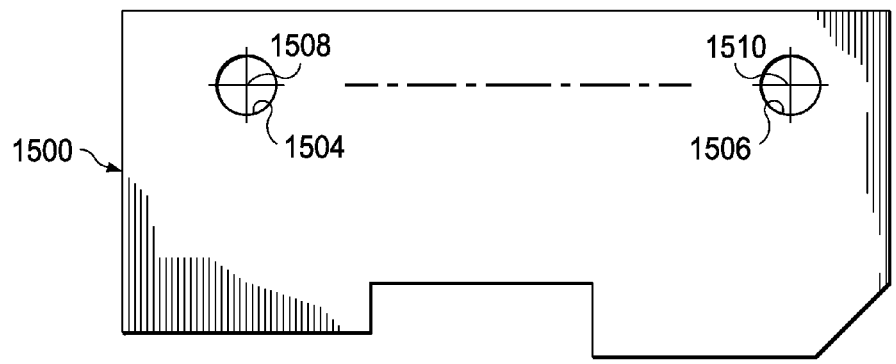
FIG. 15 is an illustration of an object in accordance with an advantageous embodiment.

With reference next to FIG. 15, an illustration of an object is depicted in accordance with an advantageous embodiment. In this example, object 1500 is an example of an implementation of an object within plurality of objects 304 in FIG. 3.

In this example, object 1500 may have primary hole 1504 and secondary hole 1506. Primary hole 1504 may have center 1508, and secondary hole 1506 may have center 1510.

Figure 16:
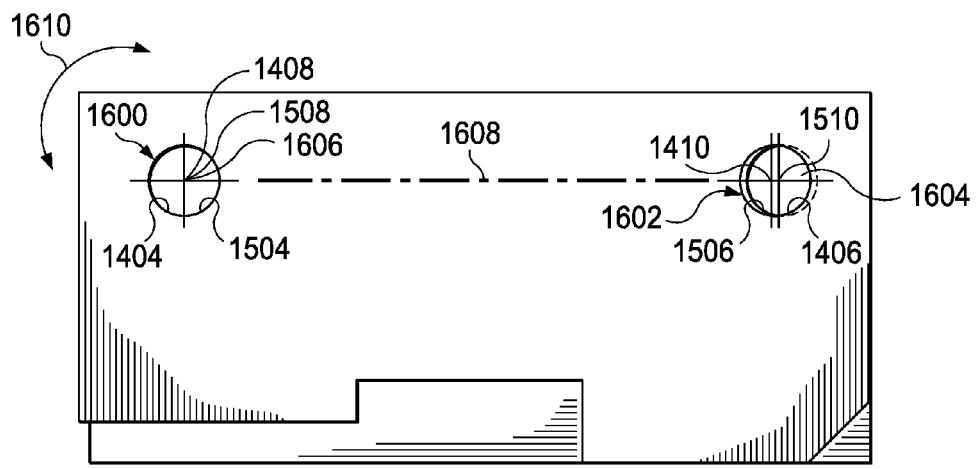
FIG. 16 is an illustration of parts for alignment in accordance with an advantageous embodiment.

Turning next to FIG. 16, an illustration of objects for alignment is depicted in accordance with an advantageous embodiment. In this illustrative example, object 1500 has been placed over object 1400. As can be seen, primary hole 1404 and primary hole 1504 form primary holes 1600. Secondary hole 1406 and secondary hole 1506 form secondary holes 1602.

Center 1408 of primary hole 1404 and center 1508 of primary hole 1504 may be aligned with each other in this example. In other words, center 1408 and center 1508 may be substantially collinear. Center 1410 of secondary hole 1406 and center 1510 of secondary hole 1506 may not align with each other. In other words, center 1410 and center 1510 may not be substantially collinear. As can be seen in this example, secondary holes 1602 may form channel 1604.

In this example, pin 334 (not shown) may be placed into primary holes 1600, and locating pin 348 (not shown) may be placed into channel 1604 formed by secondary holes 1602 to align object 1400 with object 1500. In this illustrative example, axis 1606 may extend through center 1408 in primary hole 1404 and center 1508 in primary hole 1504. Line 1608 may be a line extending from axis 1606 to substantially center 1408 and center 1508.

Rotation about axis 1606 in the direction of arrow 1610 may be possible after pin 334 is placed into primary holes 1600. Alignment and maintaining alignment between object 1400 and object 1500 may be performed by inserting locating pin 348 into channel 1604 formed by secondary holes 1602.

Figure 17:
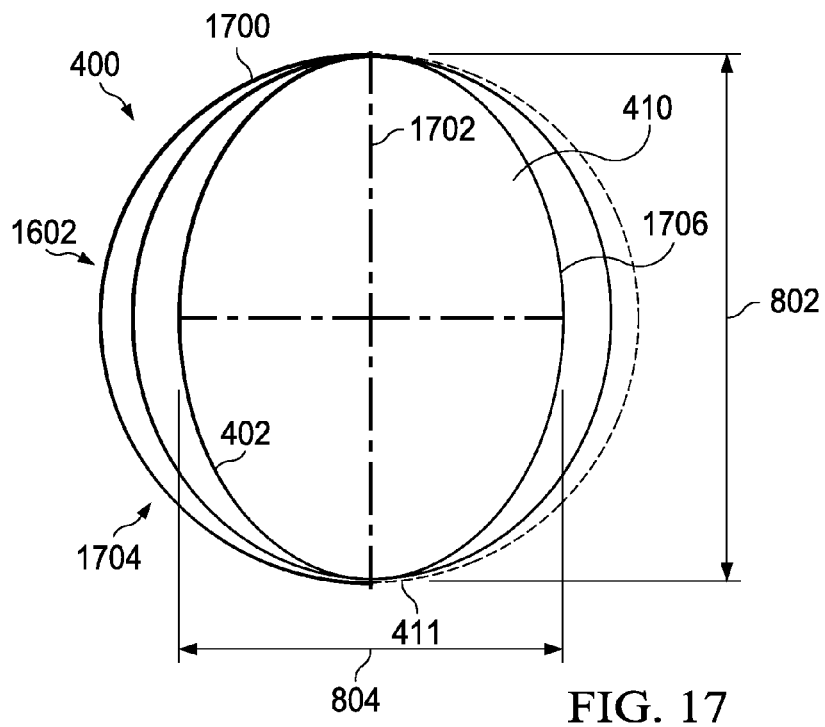
FIG. 17 is an illustration of a cross-sectional view of a locating pin in secondary holes in accordance with an advantageous embodiment.

With reference now to FIG. 17, an illustration of a cross-sectional view of a locating pin in secondary holes is depicted in accordance with an advantageous embodiment. In this illustrative example, a cross-sectional view of locating pin 400 located within secondary holes 1602 is depicted in accordance with an advantageous embodiment. As can be seen in this illustrative example, portion 411 of surface 1706 may contact walls 1700 of secondary holes 1602.

As can be seen in this example, major diameter 802 may be aligned with line 1702 and may constrain rotation about the axis in primary locating holes 1600 as depicted in FIG. 16. This axis (not shown) may be an axis substantially collinear with center 1408 of primary hole 1404 and center 1508 of primary hole 1504. Minor diameter 804 in locating pin 400 may provide a capability to avoid variations 1704 in the secondary holes.

Figure 18:
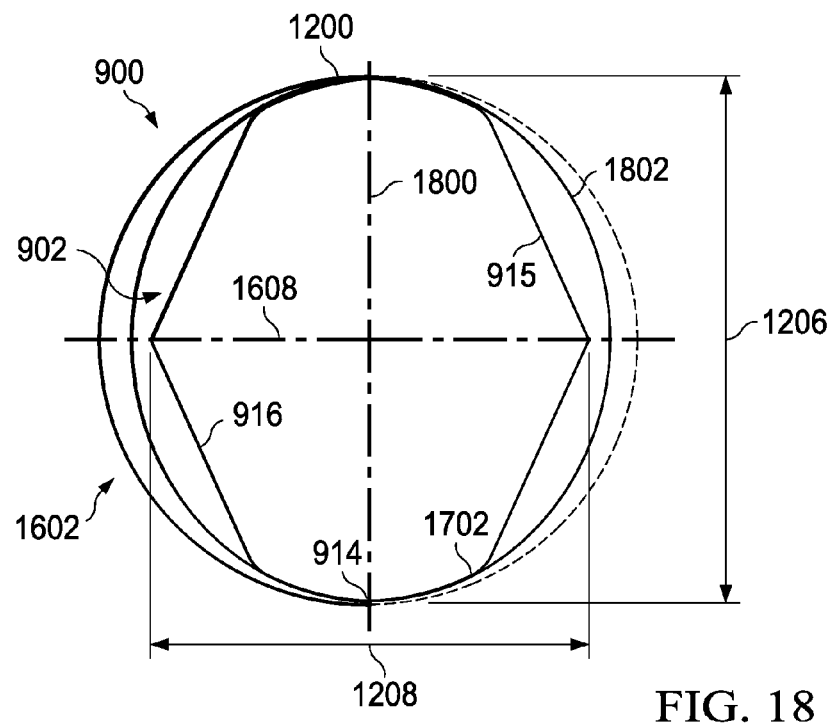
FIG. 18 is an illustration of a cross-sectional view of a locating pin in secondary holes in accordance with an advantageous embodiment.

With reference now to FIG. 18, an illustration of a cross section of a locating pin in secondary holes is depicted in accordance with an advantageous embodiment. In this illustrative example, a cross-sectional view of locating pin 900 in secondary holes 1602 may be seen. In this example, major diameter 1206 may be aligned with line 1800, which may be perpendicular to line 1608 between primary holes 1600 and secondary holes 1602. As can be seen, curved section 914 and curved section 1200 may contact walls 1802 in secondary holes 1602.

Figure 19:
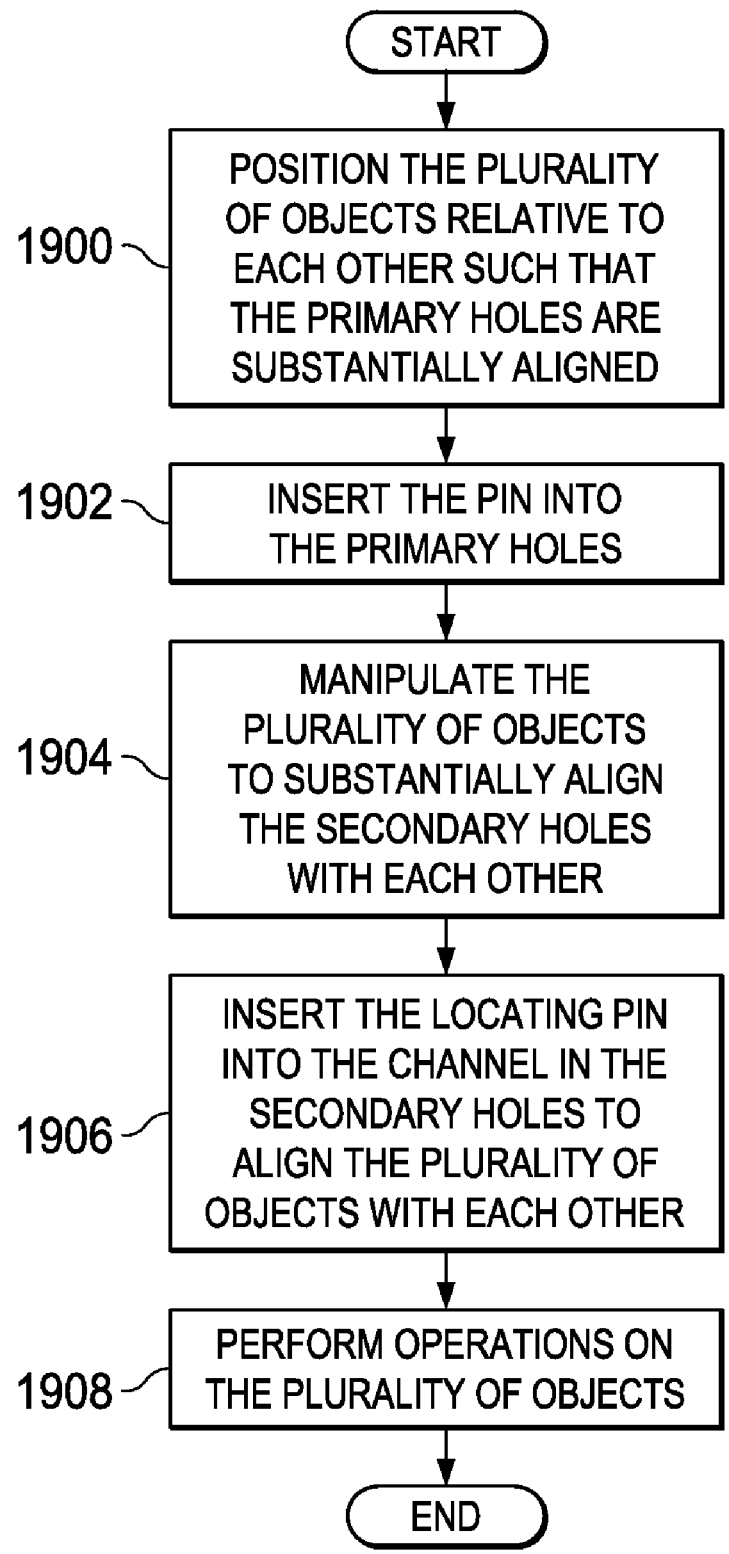
FIG. 19 is an illustration of a flowchart of a process for aligning objects in accordance with an advantageous embodiment.

Turning now to FIG. 19, an illustration of a flowchart of a process for aligning objects is depicted in accordance with an advantageous embodiment. The process illustrated in FIG. 19 may be implemented in manufacturing environment 300 in FIG. 3.

The process may begin by positioning plurality of objects 304 relative to each other such that primary holes 316 are substantially aligned (operation 1900). The process may then insert pin 334 into primary holes 316 (operation 1902). Thereafter, plurality of objects 304 may be manipulated to substantially align secondary holes 318 with each other (operation 1904). Locating pin 348 may then be inserted into channel 338 in secondary holes 318 to align plurality of objects 304 with each other (operation 1906). Indicating feature 374 may be positioned to best align plurality of objects 304. The process may then perform operations on plurality of objects 304 (operation 1908), with the process terminating thereafter.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The description of the different advantageous embodiments has been presented for purposes of illustration and description, and it is not intended to be exhaustive or limited to the embodiments in the form disclosed. Many modifications and variations will be apparent to those of ordinary skill in the art.

Although the different advantageous embodiments have been described with respect to aircraft, the different advantageous embodiments also recognize that some advantageous embodiments may be applied to other types of platforms. For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, a surface ship, an engine, a wing, a wheel, a door, a tank, a personnel carrier, a train, a spacecraft, a space station, a satellite, a submarine, an automobile, a power plant, a bridge, a dam, a manufacturing facility, a building, and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for aligning a plurality of objects, the method comprising:
   positioning a locating pin relative to secondary holes in a plurality of objects in which the locating pin comprises a segment with a cross section having an elliptical shape and a surface, wherein the segment is tapered from a first end of the segment to a second end of the segment; and
   inserting the locating pin into the secondary holes in which a number of portions of the surface align the secondary holes in a desired direction to align the plurality of objects.

2. The method of claim 1 further comprising: placing a first pin into primary holes in the plurality of objects.

3. The method of claim 1, wherein the positioning step comprises: rotating the locating pin such that the number of portions of the surface on the segment applies a force on walls of the secondary holes to align the secondary holes in a desired direction.

4. The method of claim 3 further comprising: performing the rotating step prior to inserting the locating pin into the secondary holes, while inserting the locating pin into the secondary holes, or after the locating pins has been inserted into the secondary holes.

5. The method of claim 2 further comprising: performing a number of operations on the plurality of objects with the first pin inserted into the primary holes and the locating pin inserted in the secondary holes.

6. The method of claim 2, wherein the locating pin prevents rotation of any of the plurality of objects about a centerline axis through the primary holes.

7. The method of claim 1, wherein a diameter of the locating pin has a major diameter and a minor diameter.

8. The method of claim 7, wherein the number of portions of the surface is formed by the major diameter.

9. The method of claim 1, wherein the locating pin further comprises: an indicating feature associated with the segment, wherein the indicating feature is configured to indicate a direction in which the surface aligns the secondary holes.

10. The method of claim 1, wherein a major diameter of the cross section at around the first end is configured to be inserted into a largest secondary hole in the secondary holes.

11. The method of claim 1, wherein a minor diameter of the cross section at around the second end is configured to be inserted into a portion of a channel having a smallest diameter in the channel formed by the secondary holes.

12. The method of claim 1, wherein the second end has a shape selected from one of a bullet shape and a conical shape.

13. The method of claim 1, wherein the plurality of objects is selected from at least one of a part and a tool.

14. The method of claim 1, wherein the plurality of objects is for an object selected from one of a mobile platform, a stationary platform, a land-based structure, an aquatic-based structure, a space-based structure, an aircraft, a surface ship, an engine, a wing, a wheel, a door, a tank, a personnel carrier, a train, a spacecraft, a space station, a satellite, a submarine, an automobile, a power plant, a bridge, a dam, a manufacturing facility, and a building.

15. A method for aligning objects, the method comprising:
positioning a locating pin relative to secondary holes in a plurality of objects in which the locating pin comprises a segment and an indicating feature associated with the segment; the segment has a cross section with an elliptical shape and a surface, the segment is tapered from a first end of the segment to a second end of the segment, the second end has a shape selected from one of a bullet shape and a conical shape, the indicating feature is configured to indicate a direction such that the surface aligns the secondary holes, a diameter of the locating pin has a major diameter and a minor diameter, a number of portions of the surface is formed by the major diameter, the major diameter of the cross section at around the first end is configured to be inserted into a largest secondary hole in the secondary holes, and the minor diameter of the cross section at around the second end is configured to be inserted into a portion of a channel having a smallest diameter in the channel formed by the secondary holes;
inserting the locating pin into the secondary holes, in which the number of portions of the surface align the secondary holes;
placing a first pin into primary holes in the plurality of objects in which the locating pin prevents rotation of any of the plurality of objects about a centerline axis through the primary holes; and
performing a number of operations on the plurality of objects with the first pin inserted into the primary holes and the locating pin inserted into the secondary holes.

16. An apparatus comprising:
a segment wherein the segment is tapered from a first end of the segment to a second end of the segment;
a cross section in the segment having an elliptical shape; and
a surface of the segment having a number of portions of the surface configured to align secondary holes in a plurality of objects when the segment is in the secondary holes.

17. The apparatus of claim 16, wherein the number of portions of the surface is configured to apply a force on walls of the secondary holes to align the secondary holes in a desired direction.

18. The apparatus of claim 16, wherein the segment is configured to prevent rotation of any of the plurality of objects about a centerline axis through primary holes in the plurality of objects.

19. The apparatus of claim 16, wherein the cross section in the segment has a major diameter and a minor diameter.

20. The apparatus of claim 19, wherein the number of portions of the surface is relative to the major diameter.

21. The apparatus of claim 16 further comprising:
an indicating feature associated with the segment, wherein the indicating feature is configured to indicate a direction in which the number of portions of the surface aligns the secondary holes.

22. The apparatus of claim 16, wherein a major diameter of the cross section at around the first end is configured to be inserted into a largest secondary hole in the secondary holes.

23. The apparatus of claim 16, wherein a minor diameter of the cross section at around the second end is configured to be inserted into a portion of a channel having a smallest diameter in the channel formed by the secondary holes.

24. The apparatus of claim 16, wherein the second end has a shape selected from one of a bullet shape and a conical shape.

25. The apparatus of claim 18 further comprising: a pin configured to be inserted into the primary holes in the plurality of objects.

26. The apparatus of claim 16, wherein the plurality of objects is selected from at least one of a part and a tool.

27. The apparatus of claim 16, wherein the plurality of objects is for an object selected from one of a mobile platform, a stationary platform, a land-based structure, an aquatic-based structure, a space-based structure, an aircraft, a surface ship, an engine, a wing, a wheel, a door, a tank, a personnel carrier, a train, a spacecraft, a space station, a satellite, a submarine, an automobile, a power plant, a bridge, a dam, a manufacturing facility, and a building.

28. An apparatus for aligning objects, the apparatus comprising:
a segment in which the segment is tapered from a first end of the segment to a second end of the segment, and the second end has a shape selected from one of a bullet shape and a conical shape;
a cross section in the segment having an elliptical shape in which the cross section has a major diameter and a minor diameter, the major diameter of the cross section at around the first end is configured to be inserted into a largest secondary hole in secondary holes in a plurality of objects, and the minor diameter of the cross section at around the second end is configured to be inserted into a portion of a channel having a smallest diameter in the channel formed by the secondary holes;
a surface of the segment in which a number of portions of the surface is configured to align the secondary holes to align the plurality of objects when the segment in a plurality of objects is in the secondary holes, the number of portions of the surface is relative to the major diameter, the number of portions of the surface is configured to apply a force on walls of the secondary holes to align the secondary holes in a desired direction, and the segment is configured to prevent rotation of any of the plurality of objects about a centerline axis through primary holes in the plurality of objects;
an indicating feature associated with the segment in which the indicating feature is configured to indicate a direction such that the number of portions of the surface aligns the secondary holes; and
a pin configured to be inserted into the primary holes in the plurality of objects.

* * * * *